Oct. 5, 1948.
J. C. JORGENSEN
2,450,554
INSTRUMENT POSITIONING DEVICE
Filed Sept. 20, 1944
3 Sheets-Sheet 1
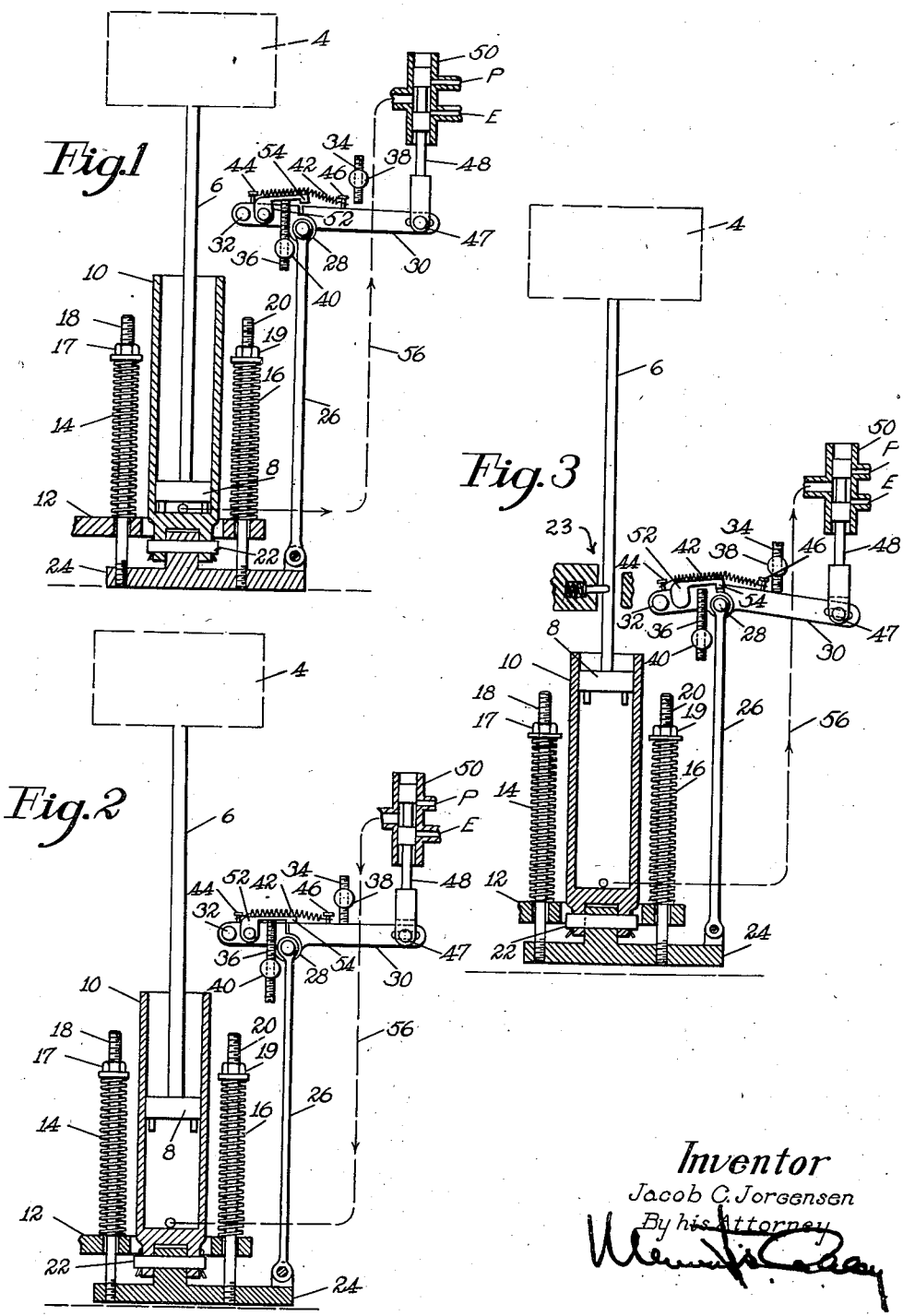
Inventor
Jacob C. Jorgensen
By his Attorney Oct. 5, 1948.    J. C. JORGENSEN    2,450,554
INSTRUMENT POSITIONING DEVICE
Filed Sept. 20, 1944    3 Sheets-Sheet 2
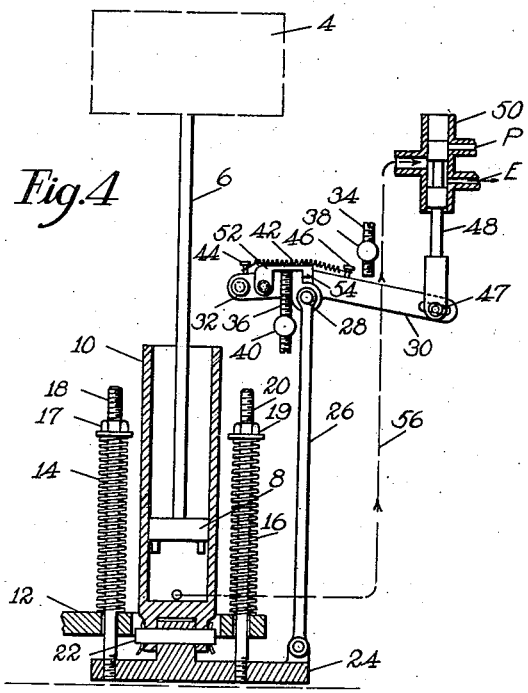
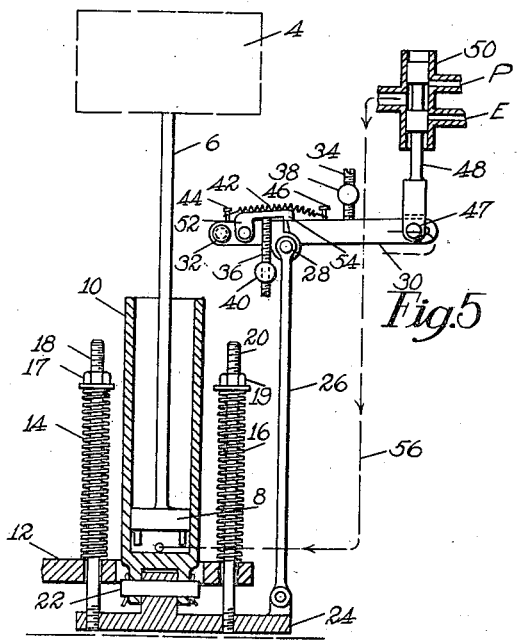
Inventor
Jacob C. Jorgensen
By his Attorney Patented Oct. 5, 1948

2,450,554

UNITED STATES PATENT OFFICE 2,450,554

INSTRUMENT POSITIONING DEVICE

Jacob C. Jorgensen, Beverly, Mass., assignor to United Shoe Machinery Corporation, Flemington, N. J., a corporation of New Jersey Application September 20, 1944, Serial No. 555,023

8 Claims. (Cl. 89—41)

This invention relates to a device for moving an instrument by power means the operation of which is initiated by a preliminary movement of the instrument, and it is more particularly concerned with a fluid pressure device for lifting or lowering an instrument such as a gun into or away from its operative position after the operator has manually begun the movement.

Instruments such as guns may be of considerable weight and it is difficult for an operator to move such an instrument quickly and easily from stowed position to operative position. This is particularly true when the installation is in an aeroplane for use at high altitudes. Searchlights, cameras and other instruments often need to be handled in a manner similar to a gun and with a minimum of exertion by the operator. Devices such as heavy doors which must be moved or swung horizontally may also require a power mechanism to aid the operator.

It is an object of this invention to provide a simple fluid pressure operated mechanism adapted to position an instrument at either extremity of a given path of movement, the actuation of the fluid pressure operated mechanism being initiated by a slight preliminary movement of the instrument away from an extremity of the path of movement at the will of the operator.

Another object is to provide a fluid pressure operated lifting device for an instrument which is actuated by a slight preliminary lifting of the instrument to relieve the operator of the weight and which is actuated by an extensive preliminary or initial movement of the instrument (as would occur to a gun in the event it is accidentally jolted from lowered and stowed position on an aeroplane in the act of diving) to counteract the extensive movement and return the instrument to its original or lowered position.

Still another object of this invention is to provide a fluid pressure operated mechanism which, while acting upon an instrument to move it in a given direction at any time, may be caused to reverse the direction of movementt of the instrument by a slight initial application of force from the operator to the instrument in said reverse direction.

To these ends and in accordance with an important feature of the invention, a fluid pressure operated piston and cylinder arrangement is provided which is resiliently mounted on a support and which may be attached to an instrument for moving the instrument relative to the support by power, the piston and cylinder arrangement being controlled by a valve actuated by initial movement of the instrument at either extremity of the path of movement of the instrument to provide pressure fluid for the power movement.

These and other important features of the invention and novel combinations of parts will now be described in detail in the specification and then pointed out more particularly in the appended claims.

In the drawings,

Fig. 1 is a sectional view, in elevation of a device in which the present invention is embodied, with a diagrammatic representation of an instrument in stowed or lowered position;

Fig. 2 is a similar view with the instrument being moved or lifted;

Fig. 3 is a similar view with the instrument in its operative or raised position;

Fig. 4 is a similar view with the instrument being returned to its stowed or lowered position;

Fig. 5 is a similar view with the instrument having reached a position just above the stowed or fully lowered position.

Figure 6:
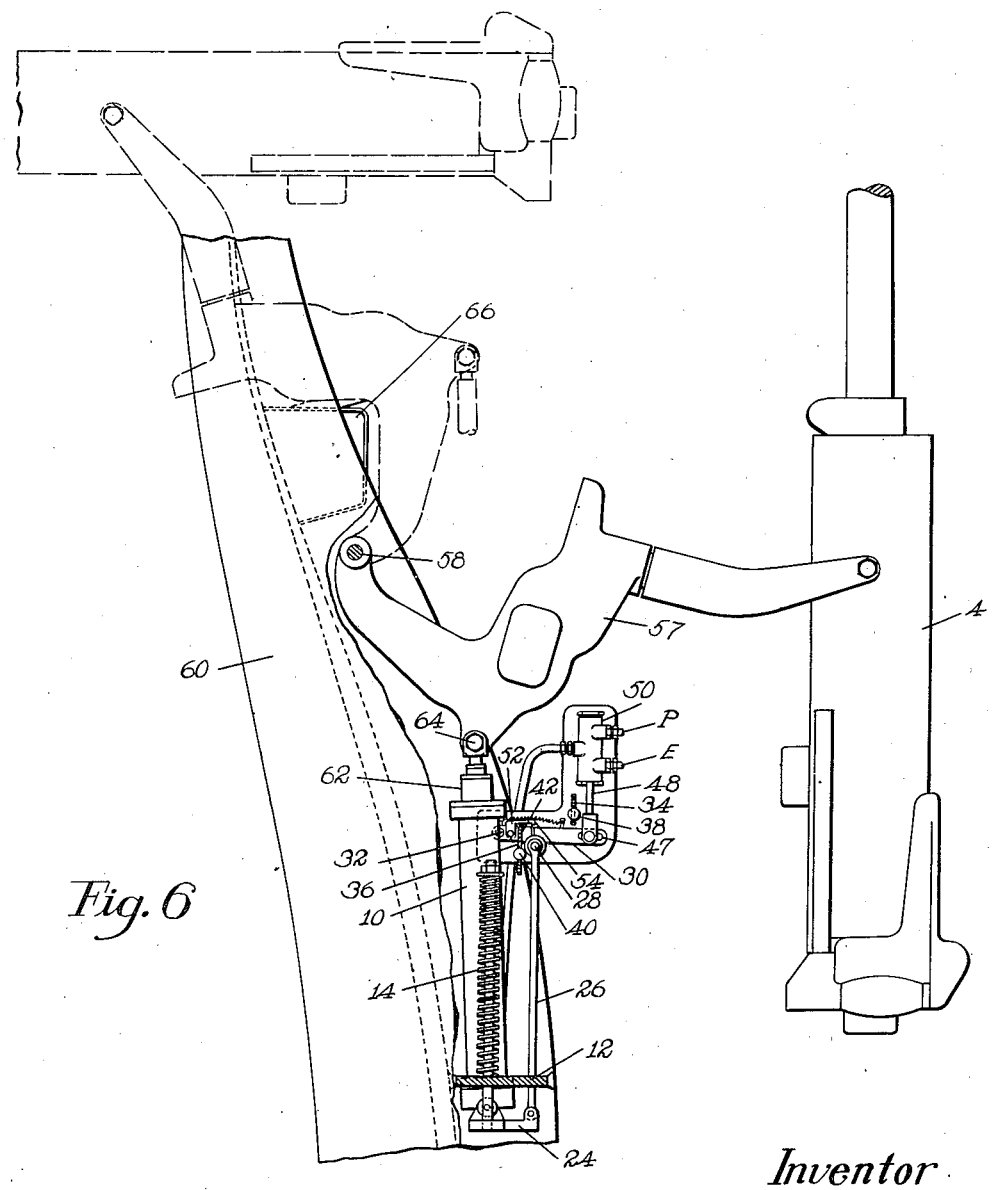
Fig. 6 is a somewhat diagrammatic view, in elevation, of a machine gun as mounted on an aeroplane with a fluid pressure operated device connected thereto, the stowed position being shown in full lines and the operative position being shown in dash lines.

In the drawings the instrument or gun 4 is diagrammatically represented and its weight is supported on a piston rod 6 provided with a piston 8 having depending lugs thereon. The piston 8 and rod 6 comprise a power actuated portion of a fluid pressure motor and this portion is mounted for vertical movement in a cylinder 10. Around the base of the cylinder 10 is a fixedly mounted shelf 12 serving as a support for the instrument and piston rod assembly. Upon the shelf 12 are mounted two coil springs 14 and 16 retained by means of rods 18 and 20 which pass freely through the shelf 12 and are fastened to a plate 24. Nuts 17 and 19 (with suitable washers) are provided for adjustment of the compression of springs 14 and 16. When the instrument or gun is in lowered or stowed position, the compression of springs 14 and 16 is such as to support the instrument with sufficient force that only a slight lift by an operator will begin the upward travel of the instrument to invoke power operation. The plate 24 is pivotally attached by a pin 22 to lugs on the base of cylinder 10. A rod 26 is pivoted to the plate 24 at one end and at its other end is pivoted to joint 28 of the articulated lever 30. Lever 30 is pivoted at a fixed point 32. Two adjustable screws 34 and 36 are mounted within fixed elements 38 and 40. Screw 34 is mounted as a stop for the lever 30 and screw 36 is mounted for a purpose subsequently to be described. A spring 42 is mounted in tension over the joint of the articulated lever 30 between pins 44 and 46. The arrangement is such that the spring 42 tends to hold the two portions of the articulated lever 30 in a straightened condition. At the end of lever 30 there is a slotted connection 47 with the valve stem 48 of a reversing valve 50, this valve being placed in a fixed position and having a hydraulic or fluid pressure power inlet P and exhaust E. On the lever 30 near the pivot 32 is pivotally mounted an inverted U-shaped latch 52 having a short end 54 which is arranged to enter the joint between the portions of articulated lever 30. A conduit 56 leads from the central portion of the valve 50 to the bottom of the cylinder 10.

In Fig. 6 a bracket 57 for supporting a gun 4 is pivoted at 58 to the frame 60 of the fuselage of an aeroplane. The fluid pressure device of this invention is shown as supported on the shelf 12 rigidly affixed to the aeroplane framework, and a conventional double acting piston 62 (in place of a single acting piston as seen in Figs. 1 to 5) is pivoted at 64 to the bracket 57. A shelf member 66 is formed on the aeroplane framework to constitute a stop or resting place for the gun 4 and bracket 57 when raised into operative position. A pin or locking member (not shown) may be provided for retaining the bracket 57 and gun 4 in their lowered positions as well as in their operative positions. Such a retaining means is advisable in cases in which accidental displacement of the instrument is possible. In Fig. 6 the valve 50 is secured to a plate fixedly attached to the fuselage frame 60.

The operation of the mechanism is as follows: Fig. 1 shows an instrument in its lowered or stowed position with its weight suspended on the springs 14 and 16 in which position of the parts pressure fluid from the cylinder 10 is free to exhaust through the line 56 and out through the exhaust port E, which is slightly open. It is to be understood that fluid lines P and E are connected to some convenient source of power. The operator, desiring to place the gun in its uppermost and operative position, i. e., the other extremity of its path of movement, grasps the gun to lift it. Upon so doing the springs 14 and 16 are somewhat relieved of their load with the result that plate 24 and rod 26 rise upwardly to swing lever 30 about the pivot 32 (see Fig. 2). Port P is thereby opened and port E is closed and pressure fluid passes into the cylinder 10 of the fluid pressure motor to aid the operator. As the gun approaches its uppermost position screw 34 limits the opening of the port P (see Fig. 2) and further upward movement of the gun causes the rod 26 to open the joint in the articulated lever 30 against tension of the spring 42 (see Fig. 3). The opening in the joint of lever 30 permits entry therein of the lever end 54 for a purpose which will subsequently appear. A follow-up action occurs in which valve rod 48 is pulled downwardly to close the port P and open the exhaust port E, when the instrument reaches its uppermost position in which it is held by a suitable detent or locking pin arrangement 23 (shown in Fig. 3 as an example) and the lifting effect is terminated. To lower the instrument or gun the operator merely pushes it down to dislodge the detent or unlocks the locking pin (if such is used) and pushes the instrument down, in which event the instrument will lower into stowed position against the cushioning effect of the fluid escaping through the port E (see Fig. 4). The lever end 54 prevents premature closing of the port E during the lowering movement of the instrument. As the springs 14 and 16 again take up the weight of the gun, rod 26 pulls the joint 28 downwardly and to a greater extent, whereupon the screw 36 swings the U-shaped lever 52 upwardly to lift the end 54 out of the joint in articulated lever 30 (see Fig. 5), and the spring 42 elevates the right-hand end portion of lever 30 into a position in which the port P is slightly uncovered, as shown in Fig. 5, to permit the fluid under pressure to leak through conduit 56 into the bottom of cylinder 10 to contribute a further cushioning effect as the instrument approaches the lowermost position. The spring 42 is bent slightly over the U-shaped lever 52 giving it a constant urge downwardly. As the instrument reaches its lowermost position again, as in Fig. 1, port P is fully closed and port E remains slightly uncovered. In Fig. 6 the use of a conventional double action piston permits a greater range of movement for the instrument, and bracket 56 may be swung from its lowered position about the pivot 58 to the other extremity of its path of movement with the bracket 57 resting upon the shelf 66 with the gun placed ready for operation.

With the apparatus as diagrammatically illustrated in Figs. 1 to 5, inclusive, the instrument 4 may be moved in such a manner or path that the operator must continually apply a slight manual effort in order to continue the power operation. In other words, if the instrument 4, as positioned in Fig. 2, were mounted to move in a vertical path, the load on the springs 14 and 16 would be substantially constant during that movement. Unless aided by the operator to move either up or down, the instrument would tend to remain stationary, i. e., the springs 14 and 16 and the valve 50 would be as they appear in Fig. 1. However, as soon as the operator exerts a slight lift or depresses slightly on the instrument 4, the valve 50 will be so actuated as to apply power to aid the operator.

In the application of the invention to a gun mount as shown in Fig. 6, the swinging of the instrument 4 and its bracket 57 about the stationary pivot 58 presents a situation in which the load to be lifted is large at first and then reduces to zero as the instrument approaches its operative or raised position. In such a case, the operator need only initiate the upward movement. As the load on the springs 14 and 16 decreases, the valve stem 48 rises slightly with the result that the operator's efforts are supplemented by power of the motor. As the instrument 4 swings upwardly about the pivot 58 against decreasing resistance (pivot 58 takes up the load) the operator's efforts may be terminated and the motor alone completes the lifting operation.

It is to be observed that the arrangement is such that a sudden and extensive upward motion of the instrument (as may be occasioned during a dive by an aeroplane in which a gun is mounted) will serve merely to open the exhaust port E. It should also be noted that the fluid pressure lifting power is cut off when the instrument is in its uppermost position and that it is held cut off by the lever end, as shown in Fig. 3. The pin 22 permits a swing of the cylinder 10 to allow for the arcuate motion (if there is such, as in Fig. 6) of the instrument as it is swung into and out of operative position. Another advantage of the arrangement is that the operator (at any time while the instrument 4 is being moved upwardly by the piston 8 may reverse the direction of movement of the instrument by applying a slight initial force to the instrument in the downward or reverse direction. Fig. 2 shows the piston 8 while in an upwardly moving position. If the operator places his hand on the instrument 4 with a slight downward pressure while the instrument is in such position, springs 14 and 16 will yield slightly and port P will be closed and port E will be opened with the result that the instrument will lower without first reaching its uppermost position. The lowering may be by power in those installations in which port E is connected to a suction line of a hydraulic system. In the case of an application of the device to the operation of a door swinging on a vertical axis (for example), it may be advisable to use one fluid pressure device to close the door and another fluid pressure device to open the door. It is easily seen that the use of twin devices for the same instrument will be advantageous when resistance to movement of the instrument in a given path is considerable in both directions. However, if a single fluid pressure device is applied to a door (for example), the piston 8 may swing the door in one direction by pressure of the fluid and may swing the door in the other direction by suction from port E. In all cases motion by power from either extremity of the path of movement of the instrument may be initiated by a slight pressure from the operator. It is to be recognized that the proper proportioning and spacing of the sections and ports of the control valve 50 should be in accordance with the operation desired and that the adjustment of the compression of springs 14 and 16 should be such that a suitable magnitude of force from an exterior source (as by the operator) will effect the valve operation.

Having described my invention, what I claim as new and desire to secure by Letters Patent of the United States is:

1. In a device adapted to lift an instrument, a support, a hydraulic cylinder resiliently mounted with respect to said support, a piston within said cylinder adapted to be connected to said instrument, valve means arranged to control the passage of pressure fluid to and from said cylinder to effect said lifting with power, and means operated by an initial lifting force applied to the cylinder to actuate the valve thereby extending the said initial movement by the application of power derived from the pressure fluid and a continuation of said lifting force.

2. In a lifting device adapted to effect the positioning of an instrument at the upper extremity of a given path of movement, a support, a fluid pressure motor resiliently mounted with respect to said support and adapted to move the instrument in said path, valve means arranged to control the passage of fluid to said fluid pressure motor to effect said movement with the aid of power, and means operated by an initial movement of the motor due to the application of externally applied force to actuate the valve thereby extending the initial movement with the aid of power from the motor, said latter means comprising a lever pivotally mounted at one end and connected to said valve at the other end, said lever having a hinged joint intermediate its ends and said joint being linked to the fluid pressure motor, a supplemental lever pivoted on said first-named lever, a spring mounted to bias a part of the supplemental lever to enter the hinged joint, and an adjustable stop for the valve end portion of the lever, and a second adjustable stop for the supplementary lever.

3. In combination with a gun mounted to swing upon a horizontal pivot into and away from a stowed or an operative position, a device arranged to move the gun about its pivot, said device comprising a support, a fluid pressure motor resiliently mounted with respect to said support, a power actuated portion of said motor being connected to said gun, valve means arranged to control the passage of fluid to and from said fluid pressure motor to effect the movement of the gun with power, and means operated by an initial bodily movement of the motor and gun to actuate the valve thereby extending the initial movement of the gun by said power movement, said latter means having stop means for closing said valve to limit the extent of the power movement.

4. In a device adapted to effect the positioning of an instrument at either extremity of a given path of movement, a stationary support, fluid pressure means mounted on springs upon the support and adapted to move the instrument in said path, a plate hingedly connected to said fluid pressure means, valve means arranged to control the passage of fluid to and from said fluid pressure means to effect said movement with the aid of power, and means linked to said plate and operated by an initial movement of the instrument due to an externally applied force to actuate the valve thereby extending the initial movement by said power movement.

5. In a device adapted to effect the positioning of an instrument, a fixed member relative to which the said instrument may be moved, a fluid pressure motor mounted for bodily and resilient movement with respect to said fixed member, means for connecting a power actuated portion of said motor with said instrument, fixed valve means for controlling the flow of pressure fluid to said motor, and linkages between said motor and valve means to actuate the latter through bodily motion of the motor thereby supplementing a force exerted on said instrument in a given direction with power from said motor.

6. In a device adapted to effect the positioning of an instrument, a source of pressure fluid, a fixed member relative to which the said instrument may be moved, reversible motor means to be actuated by pressure from said source, means for mounting said motor means for bodily and resilient movement with respect to said fixed member, means for connecting a power actuated portion of said motor means with said instrument, fixed valve means for directing pressure to said motor means to cause motion of said instrument in one direction, and linkages between said motor and valve means responsive to a slight bodily movement of the motor in the other direction to effect power movement of the instrument in said other direction.

7. In a device adapted to effect the positioning of an instrument, a fixed member, a fluid pressure motor mounted for bodily and resilient movement upon said fixed member, means for connecting a power actuated portion of said motor with said instrument, fixed valve means having relatively movable parts shiftable to operating positions for directing pressure to said motor for actuation thereof, and means mechanically actuated in response to bodily movement of the motor due to an external force to shift the said valve parts to an operating position to effect a movement of the instrument by said motor in the same direction as that of the external force.

8. In a device adapted to effect the positioning of an instrument, a fixed member relative to which the said instrument may be moved against decreasing resistance, a fluid pressure motor mounted for bodily and resilient movement with respect to said fixed member, means for connecting a power actuated portion of said motor to said instrument, fixed valve means for controlling the flow of pressure fluid to said motor, and linkages between said motor and valve means, said linkages being arranged to actuate the fixed valve means by an initial movement imparted to the instrument and motor by external force thereby extending the said initial movement of the instrument solely by means of the motor.

JACOB C. JORGENSEN.

REFERENCES CITED

The following references are of record in the file of this patent:

UNITED STATES PATENTS

| Number | Name | Date |
| --- | --- | --- |
| 1,364,525 | Scarf | Jan. 4, 1921 |
| 1,382,241 | Roe | June 21, 1921 |
| 1,828,860 | Conklin | Oct. 27, 1931 |
| 1,888,091 | Oberhoffken | Nov. 15, 1932 |
| 1,894,098 | Janisch | June 10, 1933 |
| 2,212,460 | Stephenson | Aug. 20, 1940 |
| 2,237,930 | Dewandre | Apr. 8, 1941 |
| 2,278,557 | Overbeke | Apr. 7, 1942 |
| 2,316,320 | Dewandre | Apr. 13, 1943 |
| 2,341,463 | Maytham | Feb. 8, 1944 |
| 2,366,908 | Jenkins | Jan. 9, 1945 |
| 2,371,553 | Scott | Mar. 13, 1945 |
| 2,379,180 | Pohl | June 26, 1945 |

FOREIGN PATENTS

| Number | Country | Date |
| --- | --- | --- |
| 397,274 | Great Britain | Aug. 24, 1933 |